(12) United States Patent
Gottfried

(10) Patent No.: US 11,791,689 B1
(45) Date of Patent: Oct. 17, 2023

(54) MECHANICAL ENERGY ACCUMULATOR SYSTEM

(71) Applicant: Mario H. Gottfried, Mexico D.F. (MX)

(72) Inventor: Mario H. Gottfried, Mexico D.F. (MX)

( * ) Notice: Subject to any disclaimer, the term of this patent is extended or adjusted under 35 U.S.C. 154(b) by 0 days.

(21) Appl. No.: 17/863,520

(22) Filed: Jul. 13, 2022

(51) Int. Cl.
    *H02K 7/02* (2006.01)
    *F03G 3/08* (2006.01)

(52) U.S. Cl.
    CPC .............. *H02K 7/025* (2013.01); *F03G 3/08* (2013.01)

(58) Field of Classification Search
    CPC .................................. H02K 7/025; F03G 3/08
    USPC .................................. 74/572.1, 572.2, 572.11
    See application file for complete search history.

(56) References Cited

U.S. PATENT DOCUMENTS

| | | | |
|---|---|---|---|
| 4,498,015 A | 2/1985 | Gottfried | |
| 4,765,198 A * | 8/1988 | Stravrinidis | F16F 15/30 156/218 |
| 6,122,993 A * | 9/2000 | Morris | F16F 15/305 74/572.11 |
| 6,232,671 B1 | 5/2001 | Gottfried, Jr. | |
| 7,536,932 B1 * | 5/2009 | Brown | H02K 7/025 74/572.11 |
| 8,584,552 B2 | 11/2013 | Gottfried | |
| 8,622,860 B2 | 1/2014 | Versteyahe | |
| 8,759,992 B1 | 6/2014 | Gottfried | |
| 8,853,977 B1 | 10/2014 | Gottfried | |
| 9,358,865 B1 | 6/2016 | Sherry | |
| 10,047,823 B1 | 8/2018 | Rivas | |
| 10,050,491 B2 | 8/2018 | Groves | |
| 2004/0026927 A1 | 2/2004 | Stevenson | |
| 2005/0040776 A1 * | 2/2005 | Sibley | H02K 9/227 318/150 |
| 2005/0248321 A1 | 11/2005 | Liu | |
| 2010/0206126 A1 | 8/2010 | Spears | |
| 2011/0017168 A1 * | 1/2011 | Gilpatrick | F02B 63/00 417/364 |
| 2012/0096983 A1 * | 4/2012 | Pinneo | F16F 15/305 74/572.11 |
| 2012/0234981 A1 | 9/2012 | Nagabhushan | |
| 2013/0255437 A1 * | 10/2013 | Hull | F16F 15/315 74/609 |
| 2015/0211599 A1 | 7/2015 | Baumer | |
| 2017/0353077 A1 * | 12/2017 | Pollack | H02K 11/0094 |
| 2019/0367137 A1 * | 12/2019 | Smith | F16F 15/3156 |

* cited by examiner

*Primary Examiner* — Vinh Luong
(74) *Attorney, Agent, or Firm* — Egbert, McDaniel & Swartz, PLLC

(57) ABSTRACT

A mechanical energy accumulator system has a housing with a first pair of flywheels, a second pair of flywheels and a third pair of flywheels. Each of the flywheels is formed of a ceramic material. A stator is positioned in an interior area of each of the flywheels. A pipe shaft is positioned interior of the stator. The pipe shaft has a plurality of magnets therein. A circular pipe is embedded within each of the flywheels. The circular pipe has a fluid contained therein.

14 Claims, 4 Drawing Sheets

MECHANICAL ENERGY ACCUMULATOR SYSTEM

CROSS-REFERENCE TO RELATED APPLICATIONS

Not applicable.

BACKGROUND OF THE INVENTION

1. Field of the Invention

The present invention relates to mechanical energy accumulator systems. More particularly, the present invention relates to energy storage system using arrangement of three counter-rotating pairs of electro-mechanical flywheels.

2. Description of Related Art Including Information Disclosed Under 37 CFR 1.97 and 37 CFR 1.98

While flywheels are well known in the art, there has been very little application of flywheels for energy accumulation. Some flywheels have been used, in the past, in automobile engines to smooth out the pulses of energy provided by the exploding gases in the cylinders and to provide energy for the compression stroke of the pistons. However, flywheels have seldom been used for storage of kinetic energy.

It is highly desirable to utilize flywheel systems to store kinetic energy since they can be loaded and energy drawn many times. For example, a train equipped with a kinetic energy storing flywheel could conserve a significant portion of that energy which was lost upon stopping the train. Similarly, the energy wasted in stopping a moving vehicle could also be conserved and applied to accelerating the moving vehicle or supplying the moving vehicle with electrical power. Such a kinetic energy storage system could have vast applications in a variety of fields.

The gyroscopic effect of a single flywheel arrangement clearly prohibits its widespread use as a kinetic energy storer in vehicles. If a single flywheel system were used to store much of the kinetic energy lost during the stoppage of a train, then the gyroscopic effect of the spinning flywheel could cause a train to derail when it would go around a curve. Thus, it would be desirable to use a flywheel kinetic energy storing system without having to endure the undesirable characteristics of the gyroscopic effect.

One significant effort to achieve these benefits was found in U.S. Pat. No. 4,498,015, which issued on Feb. 5, 1985, to the present inventor. This device was a flywheel device for a moving vehicle that comprised a plurality of flywheel systems connected in such a manner as to minimize the gyroscopic effects of the flywheels. The flywheels were arranged such that they spin in axes that are ninety degrees from each other. In one embodiment of the invention, this was accomplished by attaching each flywheel to a separate shaft extending through opposing sides of a closed container. One shaft extends from the top to the bottom, another from side to side along the length of the enclosure, and the third from side to side along the width of the enclosure. Each of the shafts is freely rotatable within a ball bearing arrangement mounted in each side of the enclosure. The shafts are geared into one another such that the equally sized flywheels will spin at the same rate. This patent further proposed an alternative embodiment in which each of the flywheels was the rotor in an electric motor. The flywheel-rotor included integrated windings, magnets, and stator cores. Additionally, other techniques can be used such as hydraulic motor generators or pneumatic motor generators. The axes of these motors are arranged so as to be ninety degrees from each other. The electric motors were rigidly attached at a central area between them.

Unfortunately, this arrangement of flywheels was often difficult to configure so that all of the gyroscopic effects were eliminated. After a great deal of experimentation, it was found that the rotational movement of the flywheel, along each of the axes, still contributed gyroscopic effects. As such, a solution needed to be found as to how the minimize the gyroscopic effects along each axis.

In U.S. patent application Ser. No. 08/304,520, filed on Sep. 12, 1994, by the present inventor, and entitled "FLYWHEEL ENERGY STORAGE APPARATUS", now abandoned, described a system which minimizes gyroscopic effects from the rotational movement of the flywheels. In particular, this system is an energy storage apparatus that has a housing, a pair of flywheels rotatable about a first axis within the housing, a second pair of flywheels rotatable about a second axis within the housing, a third pair of flywheels rotatable about a third axis within the housing, and an energy input means connected to at least one of the flywheels for initiating and maintaining rotational movement of the flywheels. An output energy device serves to convert the rotation of the flywheels into potential energy. Each of the first pair of flywheels rotates in opposite directions. Each of the second pair of flywheels is rotatable in opposite directions. Finally, each of the third pair of flywheels is rotatable in opposite directions. Each of the axes of the flywheel pairs are perpendicular to each other. In this system, the energy input means was a motor-generator connected to each of the flywheels of the first, second and third pairs. Each of the flywheels has a shaft which extends centrally therefrom. The shaft is rotatable with the rotation of each of the flywheels. The motor-generator is connected to the shaft. In this system, the housing has a configuration of a sealed cube. Each of the flywheels is located adjacent a side of the cube. The housing has an interior which is maintained in a vacuum condition.

After experiments with that invention, it was found that these inventions strongly minimized the gyroscopic effects of the flywheels in the system. However, in actual use, there was the danger of injury caused by the flywheels spinning at a high speed. Under certain circumstances, in the event of an automobile accident or a collision when the flywheel disintegrates or bursts, pieces of the flywheel could come off of the spinning flywheel. The high speed at which the flywheel rotated created a dangerous condition whereby the flying pieces became the equivalent of flying shrapnel. As such, a need developed so as to create such an energy storage apparatus in which each of the flywheel components would automatically brake in the event of a collision.

It is further noted that with these prior systems, it is important to be able, under certain circumstances, to absorb the energy produced by such an apparatus. Adverse effects could be created by rigidly and fixedly mounting the housing of such an energy storage apparatus directly to a vehicle. The strong forces imparted by such a device could damage the structural integrity of the vehicle. Additionally, the flywheels housed in a cubic frame, when used in vehicles, are subject to possible disintegration or damage due to road shock and vibration. Such road shocks and vibrations must be absorbed in order to reduce any threat of damage to the flywheels, especially at higher vehicle and flywheel speeds. As such, a need developed so as to be able to reduce the shock and fatigue caused by the energy from road vibration and the shocks of bumps, holes and rocks as received by the vehicle during the normal driving movement of the vehicle.

U.S. Pat. No. 6,232,671, issued on May 15, 2001 to the present inventor, describes such a flywheel energy storage apparatus with a braking capability. Additionally, the patent addressed the problems of shock and fatigue, as well as the danger of shrapnel. The apparatus is designed for a vehicle that has a housing resiliently mounted in the vehicle. The apparatus has thee pluralities of flywheels rotatable about separate axes within the housing. There is an energy input mechanism connected to one of the flywheels for initiating and maintaining rotational movement of the flywheels. An output mechanism converts the rotation of the flywheels into potential energy. Each of the flywheels of the first, second and third pairs are rotatable in opposite directions. Each of the axes are perpendicular to each other. A cradle is connected to the vehicle so as to receive the housing within the cradle. The flywheel system is designed to be safe, yet portable, as an electro-mechanical battery. The housing is in the shape of a cube. The housing has a braking capability, and is designed so as to reduce the amount of shrapnel released in the event of an accident. The integrity of the flywheel system was accomplished through the use of a stainless steel mesh formed around the housing. Additionally, a latex layer was formed beneath the stainless steel mesh, which added to both the strength and flexibility of the flywheel system.

U.S. Pat. No. 8,584,552, issued on Nov. 19, 2013 to the present inventor, teaches a high-speed conical flywheel system that has a motor, a drive shaft connected to the motor, an upper conical section affixed to the drive shaft, and a lower conical section affixed to the drive shaft opposite the upper conical section. The upper conical section and the lower conical section each have a plurality of layers, including a hollow core positioned adjacent the drive shaft and alternating layers of tempered rings and non-tempered rings arranged outwardly of the hollow core. The alternating layers of tempered rings and non-tempered rings are joined with an elastomeric adhesive. The plurality of layers further include a hollow cavity positioned outwardly of the alternating layers. A rim is positioned outwardly of the hollow cavity. The hollow cavity can be filled of the fluid.

U.S. Pat. No. 8,853,977, issued Oct. 7, 2014 to the present inventor, describes a mechanical energy accumulator suitable for being mounted in a vehicle. This mechanical energy accumulator has a spherical housing with three pairs of flywheel assemblies mounted therein. Each of the pairs of flywheel assemblies is rotatable in opposite directions about a respective axis. Each of the axes are perpendicular to one another. At least one permanent magnet motor is mounted within the flywheel assemblies. Each of the flywheels of the flywheel assemblies has a double conical flywheel base, a motor-generator suitable for driving the double conical flywheel base, and a flywheel lid covering the motor-generator. The mechanical energy accumulator may be mounted in a shell having an expansion member. The mechanical energy accumulator has a strong side and a weak side due to varying retention strength of windings therearound so as to create a controlled burst.

Importantly, U.S. Pat. No. 8,759,992, issued on Jun. 24, 2014 to the present inventor, describes a previous version of the present invention. This previous version is illustrated as "Prior Art" in FIGS. 1-3 herein. Referring to FIG. 1, there is shown the mechanical energy accumulator 10 of the prior art. The mechanical energy accumulator 10 has a generally spherical-shaped housing 12. First flywheel lid 14, second flywheel lid 16, and third flywheel lid 18 are affixed to the exterior of the housing 12. Each of these flywheel lids covers flywheels that are located internally of the spherical housing 12. These flywheels are shown in more detail in FIG. 2. The housing 12 has a configuration of a sealed sphere or ball. Three other flywheel lids are affixed to the spherical housing 12, but are not shown in FIG. 1. Each of the lids 18 is designed to be tight fitting, and secured with a winding of cable or steel, further using glue or latex rubber for an absolute failsafe sealing.

Each of the flywheel lids 14, 16, and 18 are shown having cooling lines 20 in communication with an interior thereof. The water cooling lines 20 provide for the circulation of water around the system so as to appropriately cool the flywheels as they rotate on the interior of housing 12. Brackets 22 extend outwardly from the spherical housing 12 and are used to connect the mechanical energy accumulator 10 to the interior of the vehicle.

The interior of the housing 12 is in a vacuum condition so as to minimize any friction through the rotation of the flywheels within the interior of the housing 12. This vacuum condition can be created by the use of a commercial vacuum pump acting on the interior of the housing 12. A vacuum valve 44 is shown exterior of the spherical housing 12 and may be connected to such a vacuum pump. A vacuum line also extends into the interior of the housing 12 so as to appropriately maintain cooling to the bearings, magnetics and motors in a vacuum condition.

The housing 12, along with its associated components, is positioned within the interior of a vehicle. The mechanical energy accumulator 10 is contemplated for use in conjunction with a bus. However, all vehicles or vessels can be included, including spacecraft. The mechanical energy accumulator 10 would work best in space due to the vacuum condition of space itself.

Referring to FIG. 2, there is shown an exploded view of the mechanical energy accumulator 10. The three pairs of flywheels are shown in a ball configuration. There is shown the first flywheel 24, a second flywheel 26 and a third flywheel 28. Below the flywheels is shown the spherical housing 12. The spherical shape of the housing 12 allows for a more efficient use of the volume of the mechanical energy accumulator 10. With the flywheels formed in a double-conical configuration, most of the space within the housing 12 is utilized. Each of the flywheels has a lower cone section which converges toward the center of the housing 12, and an upper cone section which follows the curved wall of the housing 12. An inner support structure 40 maintains the structure of the housing 12 and the housing wall 46. A convergence support 42 is shown in the center of the spherical housing 12. The convergence support 42 is at a point where the ends of the flywheels meet in the center of the spherical housing 12. The convergence support defines the axes about which the pairs of flywheels rotate.

Also shown in FIG. 2 is the third flywheel cap 18. The structure of the third flywheel cap 18 is essentially identical to the other flywheel caps shown in FIG. 1. There are six flywheel caps in total which cover each of the flywheels and are affixed flush with the housing wall 46 of the spherical housing 12. In the center of the flywheel cap 18, there is shown the motor 34 of the mechanical energy accumulator 10. Attached to the flywheel cap 18 are the stator windings 38 of the motor 34. Each of the flywheel caps may have identical motors 34 and stator windings 38. The stator windings 38 of the motor 34 interact with each of the rotors 36 found on each of the flywheels. The rotors 36 are situated within the stator windings 38 of the motor 34. The motor 34 can be used to initiate the rotation of each of the flywheels and also to capture energy from the rotating flywheels.

In FIG. 2, it can be seen that each of the flywheels 24, 26 and 28 rotates about axes which are perpendicular to each other. In the concept of the present invention, flywheels can also face the other sides of the housing 12. In other words, another flywheel will face the back side of housing 12 opposite the flywheel 24. A flywheel 30 will face the side opposite flywheel 26. Another flywheel 32 will face the housing 12 opposite flywheel 28. The flywheel 24 and the opposing flywheel on the other side of the housing 12, will rotate about the same axis but will rotate in opposite directions. The flywheel 26 and the flywheel 30 on the opposing side of housing 12, will rotate about the same axis but will rotate in opposite directions. Finally, the flywheel 28, and the flywheel 32 on the opposite side of the housing 12 will rotate about the same axis but in opposite directions. These flywheels, opposite each other on the same axis, turn in the opposite direction so as to achieve the gyro-neutral characteristics obtained in a three-dimensional configuration. Counter-rotating flywheels are known to neutralize certain gyroscopic effects on the same plane. The mechanical energy accumulator 10 serves to make gyro-neutral all movement aspects of the entire assembly. The gyro-effects are transferred to the enclosure, to the bearings, and to the shafts of each plane of flywheel axis. As a result, a vehicle connected to the mechanical energy accumulator 10 will be free of gyro-limitations.

Although not shown in FIG. 1 or 2, the mechanical energy accumulator 10 may be wrapped with a cable or wire winding in order adequately secure the caps. This adds strength to the system, and also prevents shrapnel from separating from the mechanical energy accumulator 10 in the event of a collision or accident. The mechanical energy accumulator 10 has an ability to flex in the event of a collision. In particular, the enclosure is appropriately flexible so that, in the event of a collision, adjacent flywheels will contact each other so as to create a braking effect by the contact of flywheel against flywheel (indicating contact at its smallest diameter).

This structure provides the maximum neutralization of the gyroscopic phenomenon. The sphere form of the three-dimensional flywheel assembly can serve as an energy storage apparatus. It is also possible that various forms could also be used so as to achieve the same neutralization of the gyroscopic phenomenon. The spinning of the flywheels in opposite directions on the same axis serves to neutralize all gyroscopic effects on that axis. The speed of each flywheel should be in synchronism and the weight of each flywheel should be the same. Since the gyroscopic effect is neutralized per plane-axis, this three-dimensional arrangement adds gyroscopic neutralization to the entire sphere. As such, all possible movements of a moving vehicle or vessel are covered.

The entire unit of this patent results in a sphere-shaped housing having six flywheels. One or more spheres can be interconnected electrically so as to operate as an electro-mechanical battery. Such a battery can be charged and recharged in an unlimited fashion. This electro-mechanical battery permits regenerative braking to occur during the operation of the motor vehicle.

The flywheels can be made of rings which are of different materials and densities. As such, certain of the rings can act as springs. The rings can be formed in layers of "half-moon" shapes so that in an impact or blow of low intensity, the flywheels will have some "give" in a spring type of absorption. Under normal centrifugal force, the rings will be rigid and remain in place. Additionally, the flywheel can be hollow or be mercury-filled, or filled with some other liquid. The liquid will allow absorption to an impact force or a strike. If the flywheel does disintegrate, the liquid will allow for a containment of the pieces of the flywheel. A liquid-filled or hollow flywheel will also offer inherent balancing and weight advantages for higher energy storage at given speeds.

Referring to FIG. 3, there is shown a schematic view of an alternative embodiment FIG. 1. The alternative embodiment is a flywheel system 50 utilizing a pipe 52 and a plurality of flywheel units 54. The plurality of the flywheel units 54 are positioned within a length of pipe 52. The bearing mounts 56 of the flywheel units 54 are exposed through openings 58 along the length of pipe 52. Aside from the bearing mounts 56, the remainder of the components of the flywheel units 54 are contained within the length of pipe 52. Similar to the configuration of the flywheels described hereinabove, the flywheel units 54 include a first pair of flywheels rotatable about a first axis within the pipe, a second pair of flywheels rotatable about a second axis within the pipe and a third pair of flywheels rotatable about a third axis within the pipe. The first, second and third axes are perpendicular to each other. Alternatively, two pairs of flywheels may be used. Each of the flywheels may have a brushless DC motor thereon. The brushless DC motor may have permanent magnet rotors. The use of the pipe 52 minimizes danger associated with the high speed of the flywheels. Further, the use of the pipe allows for a vacuum to be sustained therein.

There have been a variety of other mechanical energy accumulator systems that have been developed over the years other than those of the present inventor. In particular, U.S. Pat. No. 8,622,860, issued on Jan. 7, 2014 to Versteyahe et al., describes a method and apparatus for transferring power between a flywheel and a vehicle. The vehicle driveline includes a power source, a clutch drivingly engaged with the power source, a transmission drivingly engaged with the clutch, a power transmission device drivingly engaged with one of the power source, the clutch in the transmission, a controller in communication with the power transmission device, and a flywheel drivingly engaged with the power transmission device. The power transmission device facilitates a transfer of energy from the flywheel to one of the clutch and the transmission.

U.S. Pat. No. 9,358,865, issued on Jun. 7, 2016 to R. C. Sherry, teaches a flywheel-operated vehicle. The engine drives the flywheel using a differential axle, while also driving a pair of other differentials each of which is connected to a respective drive wheel. The rotation of half shafts of the pair of differentials are controlled to determine the extent of power transferred from the flywheel to the drive wheels during acceleration and determines the power transferred from the drive wheels to the flywheel during deceleration of the vehicle. The flywheel can be tilted around a roll axis of the vehicle to counteract roll tendencies of the vehicle when turning a sharp corner.

U.S. Pat. No. 10,047,823, issued on Aug. 14, 2018 to Rivas et al., shows an energy storage device having a housing, at least one flywheel disposed in the housing, and at least one stabilizing element disposed in the housing and configured to stabilize the flywheel. There can be at least one cooling element for cooling a region interior of the housing to a preset temperature. The stabilizing element comprises a magnet. The stabilizing element can be oriented at a position offset from a horizontal axis. The stabilizing element is oriented at a position offset from the vertical axis.

U.S. Pat. No. 10,050,491, issued on Aug. 14, 2018 to Groves et al., describes a flywheel formed of a composite material having fibers that are oriented substantially in a circumferential direction around the flywheel and embedded in a matrix material. The flywheel has an inner surface, an outer surface, and a thickness therebetween that defines an axis of rotation. A plurality of load masses are distributed circumferentially on the inner surface at a longitudinal segment along the axis. A rotation of the flywheel around the axis with a rotational velocity generating hoop stress in the fibers in the circumferential direction and through-thickness stress is generated in the matrix material in a radial direction.

U.S. Patent Application Publication No. 2004/0026927, published on Feb. 12, 2014 to Stevenson et al., describes a flywheel-based regenerative energy management system. The system has a flywheel assembly within integrated motor-generator which is coupled to a drivetrain motor-generator. The coupling between the flywheel assembly in the drivetrain motor-generator includes a system controller having integrated voltage control and inverters. The system controller has integrated inverters and voltage control that determine the direction and flow of current between the flywheel assembly and the drivetrain motor-generator.

U.S. Patent Application Publication No. 2005/0248321, published on Nov. 10, 2005 to Liu et al., provides a flywheel energy storage system including a driving wheel rotatable relative to a first axis, an electric motor for driving the driving wheel, an electric generator, a driven wheel adapted to drive the electric generator, a flywheel rotatable relative to a second axis parallel to the first axis, a clutch assembly for disengagement or engagement of the flywheel and the driven wheel, and a transmission gear train assembly engagingly interposed between the flywheel and the driving wheel and adapted for conveying kinetic energy from the driving wheel to the flywheel.

U.S. Patent Application Publication No. 2010/0206126, published on Aug. 19, 2010 to Spears et al., provides an advanced flywheel hub for use in a flywheel rotor assembly. The hub includes a shaft-engaging portion and a rim-engaging portion that is configured for maintaining engagement with the shaft and the rim during operational rotation of the flywheel rotor assembly. The hub exhibits a bending mode and includes a first layer having axial fibers for stiffening the hub with respect to the bending mode. The hub can further include a stiffening arrangement for increasing the radial stiffness of the shaft-engaging portion.

U.S. Patent Application Publication No. 2012/0234981, published on Sep. 20, 2012 to Nagabhushan et al., describes a split flywheel assembly with attitude jitter minimization. The split flywheel assembly includes a plurality of independent concentric flywheels axially aligned and in operable engagement with one another such that each flywheel is configured to be independently controlled in order to manipulate the phase difference therebetween.

U.S. Patent Application Publication No. 2015/0211599, published in Jul. 30, 2015 to T. Baumer, this discloses a flywheel energy store having a rotor having such a hub, and a flywheel energy store having the rotor. The hub is produced as one piece from a carbon fiber-reinforced plastic laminate having a network of carbon fibers that cross at a weaving angle and having a matrix material.

It is an object of the present invention to provide a mechanical energy accumulator system which reduces and minimizes gyroscopic effects.

It is another object of the present invention to provide a mechanical energy accumulator system that has a very long life.

It is another object of the present invention to provide a mechanical energy accumulator system that allows for the production of electrical energy.

It is another object of the present invention to provide a mechanical energy accumulator system which minimizes interior friction.

It is a further object of the present invention to provide a mechanical energy accumulator system which reduces the potential for damage and destruction in the event of an accident or in the event of a damaging occurrence.

It is another object of the present invention to provide a mechanical energy accumulator system which can operate with other flywheel systems, other batteries, and other engines.

It is a further object to the present invention to provide a mechanical energy accumulator system that has an extremely strong flywheels.

It is a further object of the present invention to provide a mechanical energy accumulator system that restrains a mass expansion of the rotor.

It is another object of the present invention to provide a mechanical energy accumulator system which avoids surface particle fly-off.

It is another object of the present invention to provide a mechanical energy accumulator system that attenuates micro-vibrations.

It is a further object of the present invention to provide a mechanical energy accumulator system that self-corrects for imbalances.

These and other objects and advantages of the present invention will become apparent from a reading of the attached specification and appended claims.

BRIEF SUMMARY OF THE INVENTION

The present invention is a mechanical energy accumulator system that comprises a housing, a first pair of flywheels rotatable about a first axis within the housing, a second pair of flywheels rotatable about a second axis within the housing, and a third pair of flywheels rotatable about a third axis within the housing. The flywheels of the first pair of flywheels are rotatable in opposite directions. The flywheels of the second pair of flywheels are rotatable in opposite directions. The flywheels of the third pair of flywheels are also rotatable in opposite directions. The first axis, the second axis and the third axis are perpendicular to each other within the housing. The housing has openings thereon which correspond to the locations of each of the first pair of flywheels, the second pair of flywheels and the third pair of flywheels. Each flywheel of the first, second and third pairs of flywheels is formed of a ceramic material. Each of the flywheels has an interior area. A stator is positioned in the interior area of each of the flywheels. A pipe shaft is positioned interior of the stator. The pipe shaft has a plurality of magnets therein.

A pin-and-jewel bearing supports the pipe shaft. The stator comprises a plurality of stators that are respectively secured to each of the first pair of flywheels, the second pair of flywheels and the third pair of flywheels. A pair of magnetic bearings is positioned respectively at opposite ends of the pipe shaft. Each of the pair of magnetic bearings is a doughnut-shaped magnet.

The plurality of magnets of the pipe shaft comprise four magnets arranged in the pipe shaft. A pair of N magnets is at diametrically opposite locations in the pipe shaft. A pair of S magnets is at diametrically opposite locations in the pipe shaft. The plurality of magnets are generally spaced approximately 90° from each other around the circumference of the pipe shaft. Each of the plurality of magnets has a magnetic face adjacent an outer diameter of the pipe shaft. The pipe shaft has a plurality of slots formed in a wall thereof. This plurality of slots opens to an interior diameter of the pipe shaft. The plurality of slots respectively receive the plurality of magnets.

A pipe is formed within each of the first pair of flywheels, the second pair of flywheels and the third pair of flywheels. This pipe has a fluid therein. In the preferred embodiment of the present invention, the fluid fills approximately one-half of the volume of the pipe. The pipe extends in a circular configuration concentric with an outer diameter of the flywheel. The pipe extends in this circular configuration approximately midway between an inner diameter and an outer diameter of the flywheel.

In the present invention, each flywheel of the first pair of flywheels, the second pair of flywheels and the third pair of flywheels has a first half body and a second half body that are affixed together. At least one of the first half body and the second half body has a channel formed therein. The pipe is positioned within this channel. The cannel is circular. Each of the flywheels has a generally conical configuration.

A sleeve is affixed to and extends around an outer diameter of each of the flywheels of the first pair of flywheels, the second pair of flywheels and the third pair of flywheels. The sleeve is formed of a carbon fiber material.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

BRIEF DESCRIPTION OF THE SEVERAL
VIEWS OF THE DRAWINGS

DETAILED DESCRIPTION OF THE
INVENTION

Figure 4:
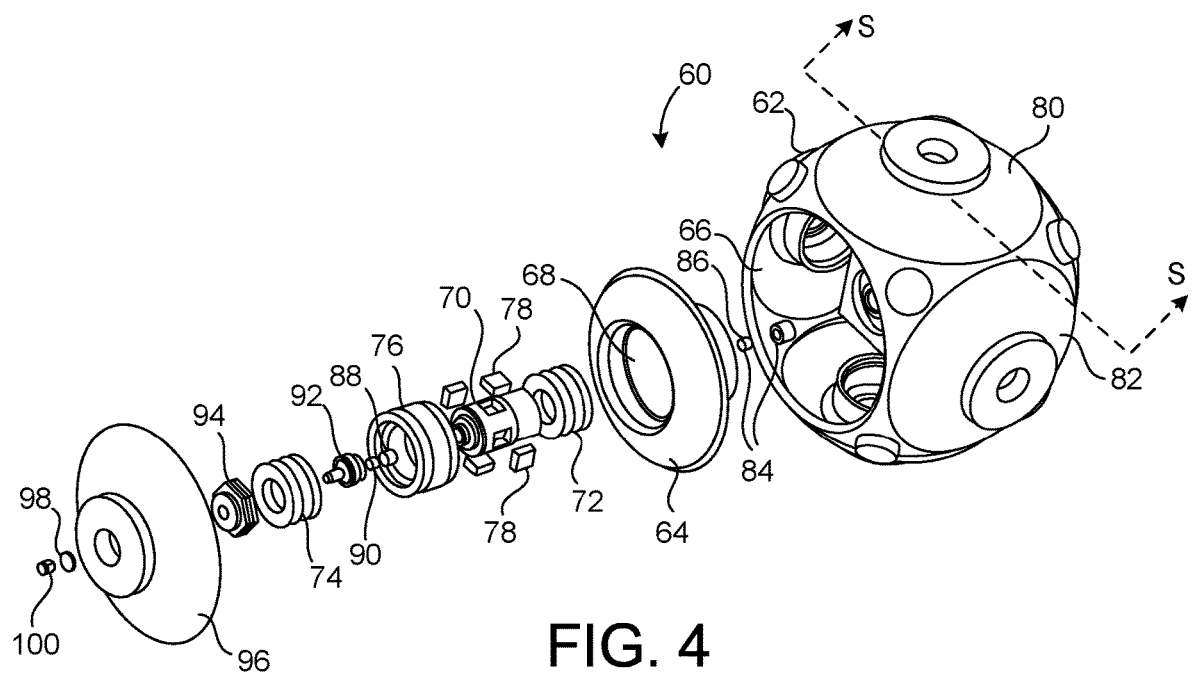
FIG. 4 is an exploded perspective view of the mechanical energy accumulator system of the present invention.

FIG. 4 is an exploded view showing the mechanical energy accumulator system 60 of the present invention. The mechanical energy accumulator system of the present invention includes a housing 62 having a flywheel 64 received within an opening 66 of housing 62. Flywheel 64 is of a ceramic construction and has an interior area 68. Flywheel 64 has a generally conical or double conical configuration. A rotor shaft 70 is supported by magnetic bearings 72 and 74 at opposite ends thereof. Magnetic bearings 72 and 74 are doughnut-shaped magnetic bearings. A stator core 76 is positioned so as to be received within the interior area 68 of flywheel 64 and be positioned over rotor shaft 70. It can be seen that the magnets 78 are positioned so as to be received within slots formed on the rotor shaft 70. Magnets 78 will interact with the windings in the stator core 76 for the transfer of energy.

Figure 1:
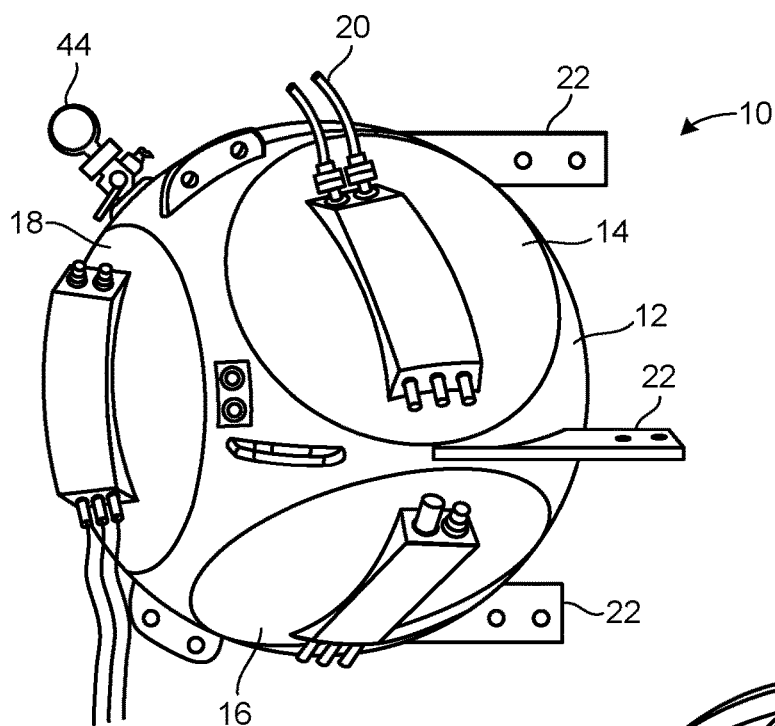
FIG. 1 is a perspective view of the exterior of a prior art mechanical energy accumulator system of the present inventor.
Figure 2:
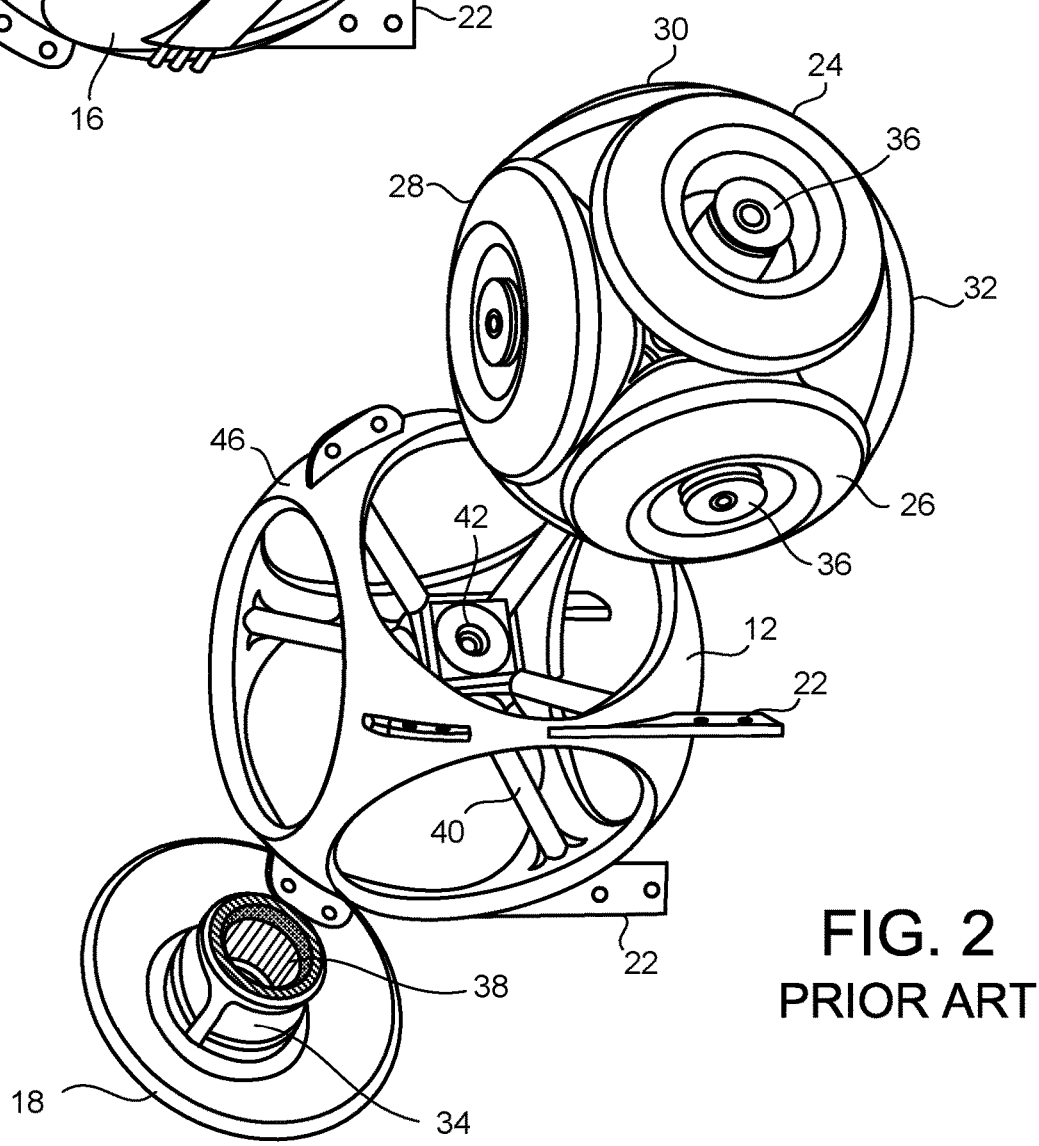
FIG. 2 is an exploded view of the prior art mechanical energy accumulator system of FIG. 1.
Figure 3:
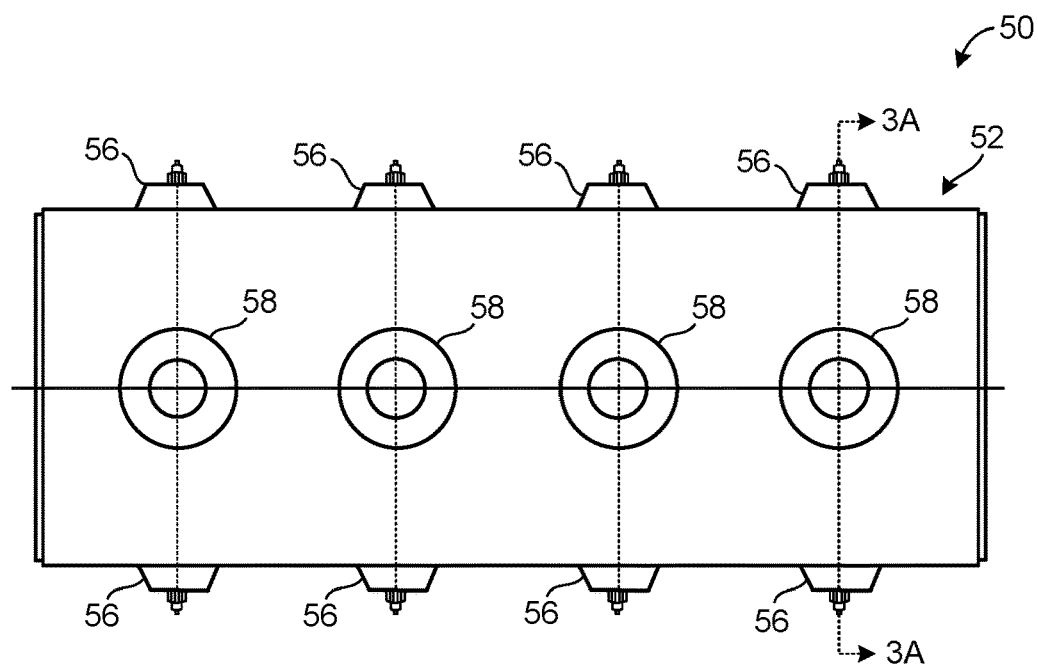
FIGS. 3 and 3A are side and cross-sectional views, respectively, of an alternative embodiment of the prior art mechanical energy accumulator system of FIG. 1.
Figure 3A:
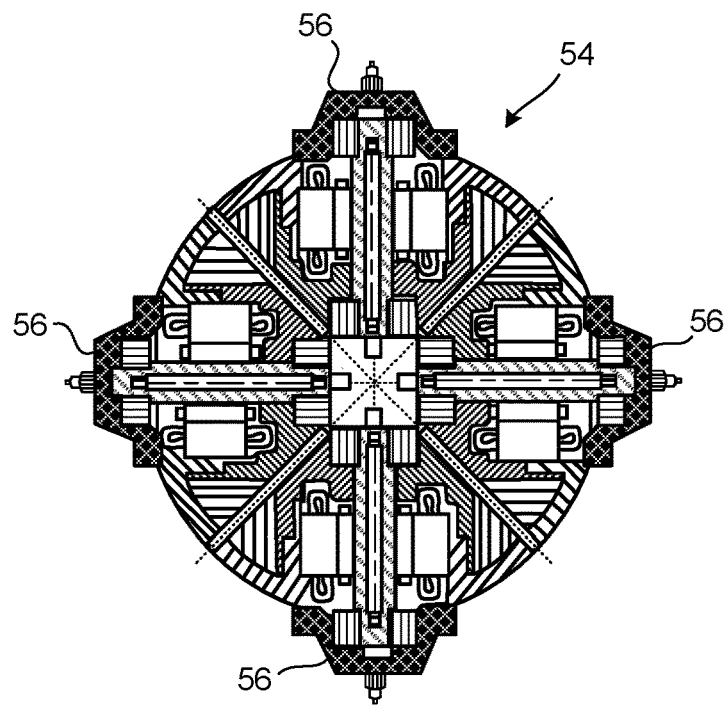

The housing 62 will, in particular, have flywheel 64 positioned in opening 66. There will be a second pair of flywheels (such as shown in FIGS. 2 and 3) positioned within the housing 62 below cover 80. Another flywheel will be positioned in housing 62 built under cover 82. The construction of the housing 62 will have the first pair of flywheels (such as shown in FIGS. 2 and 3), the second pair flywheels and the third pair of flywheels (such as shown in FIGS. 2 and 3) configured in the manner shown herein in association with FIGS. 1-3. The first pair of flywheels will rotate within the housing 62 in opposite directions. The second pair of flywheels will rotate within the housing 62 in opposite directions. The third pair of flywheels within the housing 62 will rotate in opposite directions. The first pair of flywheels will rotate about a first axis. The second pair of flywheels will rotate about a second axis. The third pair of flywheels will rotate about a third axis. These axes will be perpendicular or transverse to each other within the housing 62. The interior 66 of the housing 62 will be maintained in a vacuum condition.

In FIG. 4, it can be seen that there is a jewel bearing 84 extending in the housing 62. A point bearing 86 will be received by the jewel bearing 64 in a "pin-and-jewel" arrangement. Another jewel bearing 88 will receive point bearing 90 also in another pin-and-jewel type of configuration. A fine adjustment assembly 92 will act on the point bearing 90 and the jewel bearing 88. The fine adjustment assembly 92 will extend to an adjustment insert 94. A frame lid 96 will cover the assembly within the interior of the housing 62. A flat washer 98 and a fine adjustment nut 100 complete the assembly. This arrangement of elements will extend for each of the flywheels within the interior of the housing 62.

Figure 5:
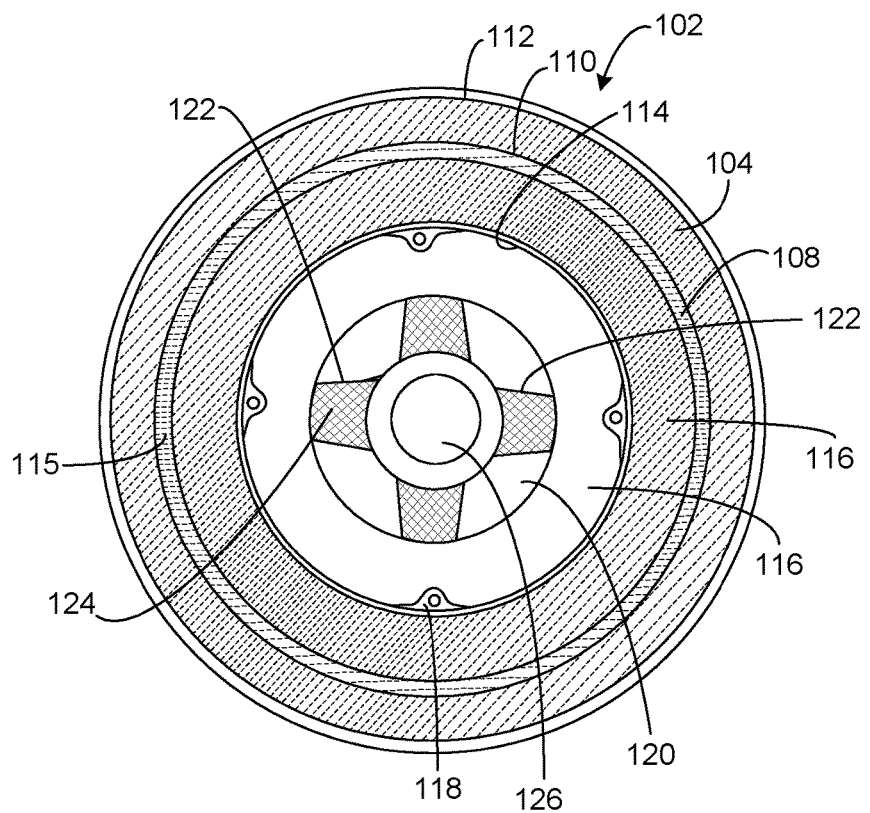
FIG. 5 is a cross-sectional view taken across lines 5-5 of FIG. 4 showing one of the flywheels of the mechanical energy accumulator system of the present invention.

FIG. 5 shows the configuration of a flywheel assembly 102 located within the interior of housing 62. Initially, it can be seen that the flywheel assembly 102 has ceramic masses 104 and 106. A pipe 108 will be embedded within a channel 110 formed in the ceramic masses 104 and 106. In particular, in the present invention, the flywheel assembly 102 will have a first half body and a second half body formed of a ceramic material. This first half body and the second half body can be joined to each other by mechanical means, by adhesives, by molding, or by other techniques. The channel 110 is formed at least one of the first half body in the second half body. The pipe will be installed within channel 110. Pipe 108 has a circular configuration that is generally concentric with the outer diameter 112 of the ceramic mass 104. This pipe 108 will be generally positioned midway between the outer diameter 112 and an inner diameter 114 of the ceramic mass 106. The pipe 108 will have a fluid 115 therein. In the preferred embodiment of the present invention, this fluid 115 will fill approximately one-half of the volume of the pipe 108.

The motor stator 116 is located within the interior area of the ceramic mass 106. It should be noted that the ceramic masses 104 and 106 are integrally formed together in a molding process. The ceramic masses are simply separately identified as being on opposite sides of the pipe 108. The motor stator 116 is bolted to the ceramic mass by stator bolts 118. The motor stator can act as an AC/DC universal motor.

Figure 6:
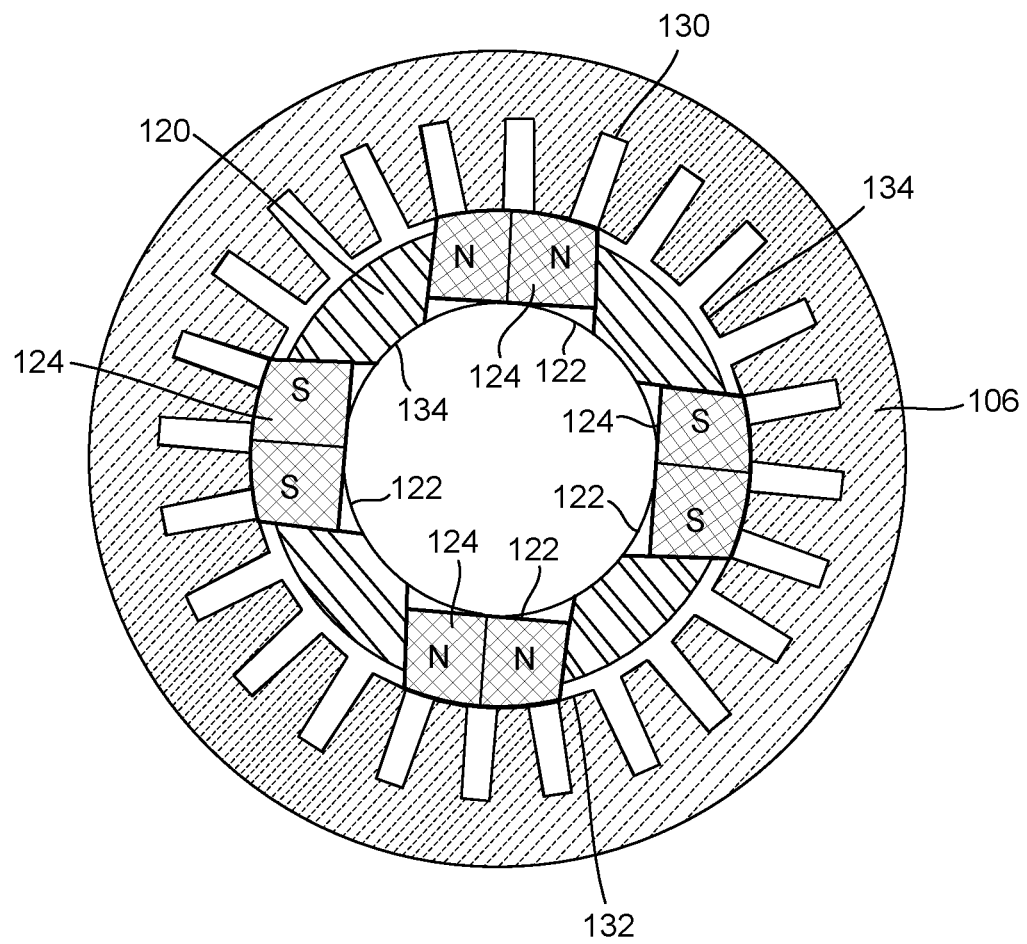
FIG. 6 is a cross-sectional view taken across lines 5-5 of FIG. 4 showing the relationship between the stator and the pipe shaft in the mechanical energy accumulator system of the present invention.

The pipe shaft 120 is positioned interior of the motor stator 116. Pipe shaft 120 acts as a rotor. Pipe shaft 120 includes slots 122 therein. Slots 122 serve to receive the magnets 124 therein (as shown in FIG. 6 hereinafter). In particular, there are four slots 122 for receiving four magnets. These slots are closed on the outside and open at an interior so as to fit tight. The pin-and-jewel bearing 126 will act on the inner diameter of the rotor 120.

FIG. 6 shows a detailed view of the motor stator 106 and the rotor 120. It can be seen that the motor stator 106 has a plurality of channels 130 that are formed so as to face an inner diameter 132 of the motor stator 106. Channels 130 are adapted to receive windings therein. The pipe shaft 120 includes slots 122 that open to the inner diameter of the pipe shaft 120. Magnets 124 are received in the slots 122, respectively. Each of the magnets 124 has a magnetic face generally adjacent to the outer diameter 134 of the pipe shaft 120. As such, the magnetic face of the magnets 124 will be adjacent to the windings supported by channels 130 of motor stator 106. It can be seen that there are a pair of N magnets 124 that are in diametrically opposed locations on the pipe shaft 120. There are a pair of S magnets that are in diametrically opposed locations on the pipe shaft 120. Each of the magnets 124 is spaced by 90° from an adjacent magnet.

The present invention achieves significant advantages over the prior art. In particular, the ceramic flywheel is particularly new when compared to the traditional method of using brass or steel. Ceramics are often employed in dishes and electric isolators. There also employed in many applications were different clays and earths or compounds involving metal and base element oxides are employed. Ceramics can incorporate colors, glaze and other materials necessary to accommodate size, speed, vibration, fatigue and mass. The strength and resistance is generally known in the field of ceramics. However, recent developments involving titanium oxide mixtures shows promise. The ceramic flywheel is produced by using a precise measure of select powders, time, temperature, pressure, and molding. It can be tempered to a very great strength.

The baked clays associated with ceramics to achieve a very high strength. In the present invention, the present invention casts ceramic flywheels and forms a precision mold of two halves of the flywheel with the embedded pipe within a channel formed by the mold. The embedded pipe can have a fluid integrated therein. So as to reinforce the ceramic flywheel, a pre-made belt of a very strong carbon fiber and resins can be utilized on the outer diameter of the ceramic flywheel so as to restrain the centrifugal effect of mass expansion of the rotor and achieves surface particle fly-off resistance. Alternatively, a metallic or ceramic belt can be pressed or glued on to the outer diameter of the ceramic flywheel.

The ceramic flywheels can be mass-produced including pre-tested formulations and loading. Importantly, in the past, ceramics have not been used in association with flywheels because of the difficulty in the ease of repair.

The present invention provides improved safety. The mechanical energy accumulator system of the present invention is operated behind protection in two main applications. A bank of these mechanical energy accumulator sets can be positioned in a stationary location and hidden from bullets or accidents. An empty steel pipe embedded in the earth and sealed is able to pack and operate banks of these mechanical energy accumulator systems. This can serve as a regenerative braking battery so as to absorbed the surge of current for use in several to many banks. The mechanical energy accumulator system of the present invention can also be utilized in reinforced basements or rooms underground. Well-made and well-balanced ceramic flywheels should have a useful life of many years of loading and unloading electricity into mechanical work.

Portable mechanical energy accumulator systems of the present invention can complement most electric drives by being mounted in vehicles, such as electric cars, trucks and buses, machine tool-type vehicles, trams, trains, boats and spacecraft. The problem of road shock found in pavements everywhere would require that the speed of the flywheel be reduced to a safe peripheral velocity. Even though the speed of rotation of the flywheel is reduced, the energy storage feature still exists. On smooth roads and with special suspensions in the vehicles, flywheels can increase the speeds and become more energy-efficient.

In the present invention, it is been found that 6000 flywheel/motors can be put in 1000 spherical vacuum housings. Rated at 1 kWh per flywheel/motor, the present invention can produce 6 MWh of electricity. Large solar cell arrays and wind farms can also use the mechanical energy accumulator system of the present invention as a large battery configured for a long life duty.

In the event of fatigue or failure, and if one flywheel should become damaged or burst, only that one pipe with three or four mechanical energy accumulator sets will suffer this failure. Stationary uses, such as in uninterruptible power systems or fire-pump backup systems, can go faster and store more energy when positioned away from humans and the accidents created by humans. Around humans, it is necessary to estimate an excess danger speed range. To assure safety, the flywheel should be operated 50% of maximum capacity in order to reduce the risk due to some rare accident. A maximum in a vehicle that is parked and stopped is 60% rated capacity.

Another use of the present invention is to recover the energy and regenerative braking in association with city transit buses, subways, and school buses. These are enhanced where energy absorption is quicker with less resistance to accelerate mass versus weight of the flywheel versus motor power. The weight and mass formulation of a ceramic rotor can be lighter by weight when there is an excess number of flywheels catching the energy. In this manner, the system is capable of absorbing a load of energy quickly during stops and parking at depots. The present invention can utilize a quick-connect plug, trolley, or induction field.

The present invention assembles the sets of flywheels and motors on the same shaft. Ultra-high dynamic balancing with very low vibration outside perceptible vibration or harmonics is achieved. This is important because the circular pipe that is filled half with fluid attenuates micro-vibrations and serves to balance the system. Each complete six section unit it has six complete rotors, six flywheels, six shafts and motor rotors that are fit in the frame with six motor stators, and twelve pin-and-jewel bearings (all in sets). Each set is identical. Every set has zero machining and fits together perfectly. The present invention can employ a harness of electrical connections and a cooling water circuit (as shown in FIG. 3 hereinabove) to the motors via heat exchangers.

The present invention is able to be manufactured by the thousands every day. The system can be used alone or in banks welded in a container for fast and easy assembly and deployment. The sizing of the flywheels and the mechanical energy accumulator sets can vary according to the load. For example, when operating a tram, the regenerative braking would require flywheels to be larger than a battery for a wheelchair. Generally, different sizes and weights of flywheels would be needed. The system of the present invention can achieve regenerative and fast charging for up to fifty years of service. This can save a very large amount of fuel and further protect the environment.

It is possible in the present invention that further strength of the ceramic flywheels can be achieved by baking mixtures of ceramic with resin. Certain universal ingredients for casting ceramic parts include aluminum oxide, silica, zircon sand, cobalt and others. Known proportions of compound powders are pressed and fired correctly for high-strength. This offers very low fatigue when compared with metal and steel. Ceramics technology is well known in many fields. As such, the employment of ceramic technology in association of the flywheel of the present invention is an important development relying upon existing ceramics technology.

The flywheel the present invention is cast into two half bodies and then fused together with adhesives to form a solid very strong ceramic flywheel. The channels are formed within at least one of the halves so as to receive a brass tube that can be half-filled with a fluid. The serves to self-correct the imbalance due to several causes, such as centrifugal forces. At speed, the fluid will form a flat in half of the periphery, upon which the fluid can move under harmonic frequency. This flexible and near-precision cycling neutralizes and serves as a self-balancing device. The added softness in the harmonics will also soften spikes.

At 60,000 rpm, the practical uses of the mechanical energy accumulator system of the present invention would have a capacity that is less than that of a lithium based battery. However, the present invention will last as long as the magnetic force remains intact, approximately forty-nine years. Lithium batteries only last eight years in the best of conditions. In the recovery of regenerative braking energy, the mechanical energy accumulator system of the present invention boasts 45% recovery of a quick acceleration of flywheels. After ten stops, the recycled original energy still has a presence. The lithium or other chemical batteries are limited by the time involved in a chemical reaction. They are best able to absorbed energy at approximately 11%. Almost nothing can be twice recycled.

The present invention utilizes the pin-and-jewel bearing system. On each end of the shaft are a pair of large strong doughnut magnets. The reduced section does not allow either side to touch its own opposing pole and is set as N-N or S-S. The center is formed from a cooked aluminum oxide cone and is maintained by not allowing the shaft to move off dead center by using the titanium pin and aluminum oxide jewel as the only touching point. The pin is made of titanium and almost loose within the conical jewel well. The pin-and-jewel touch with very minimal pressure. The pin and ceramic cone is highly polished for long life duty. The life of the unit so as to maintain its own magnetism is approximately fifty years. The lubricant is present for many years in a sealed cavity in the pin. It leaks only a small amount over the years. These parts will rarely do anything more than touch. When the set of flywheels of the mechanical energy accumulator system of the present invention endures movements, the pin-and-jewel bearings can be larger but apply the same light pressure. When the use is stationary, the pin-and-jewel bearings can be smaller.

Ultimately, the housing and the caps of the present invention could also be made with ceramics in order to achieve high strength and resistance. This can be achieved without machining. The hardened ceramic material can be loaded, pressed and finished in a mold.

It is important to have a vacuum on the interior of the housing in which the flywheels rotate. The best way to achieve a deep vacuum is to burn off remaining material/gas after a mechanical pump initiates as a helper vessel. A first valve opens to operate a commercial vacuum pump. The valve is closed so as to achieve a partial vacuum. A better vacuum is achieved by a further burn of expanding gases in the closed vessel/chamber, with the valves open, between the helper vessel. The main valve is then closed. The loss of air that expanded when hot now makes a deeper partial vacuum especially when the burn gas is hydrogen.

The mechanical energy accumulator system of the present invention utilizes six sets of motors and flywheels, a rotor mounted on a pipe shaft, and spaces for four premade and shaped magnets so as to achieve a four pole electric motor. The shaft also rides on powerful doughnut-style magnets held by a pin-and-jewel seat bearing. Everything is assembled in a housing with six caps and sealed in a hard vacuum. The electric motor is an AC and/or DC universal motor. The magnets are mounted to deal with centrifugal pressure without movement or weakening in the mounting.

The hollow shaft is also the motor shaft. The pipe shaft is slotted with a conical-closing square hole that is open to allow the four magnets to be introduced thereinto. The hollow shaft has just enough space to fit large magnets. The hole is slightly closed on the inside of the pipe shaft to the outside rim. The shape of the magnets is dimensioned to fit in the hole that tightens upon spinning at high speed. As such, the magnetic face of the magnets is close to the peripheral outer diameter of the pipe shaft.

An important feature the present invention is the accurate self-balancing of the rotors. Sensitive automatic balancing machines reduce balancing to "no detect" as acceptable parameters. However, near zero micro-vibration is extremely hard to detect. This is true on rotors such as aviation turbines and high-speed compressors. One obstacle to high-speed rotors has been a difficult to read it inaccurate and the undetectable vibration. The present invention overcomes these problems by countering poor balancing.

The use of the circular pipe within the middle of the ceramic mass is essential for reducing by abrasions and micro-vibrations in the present invention. The pipe is half-filled with a fluid and the fluid is free to move within the interior of the pipe. The pipe holds the selected fluid permanently and sealed within a metallic tube. The fluids can be anything from mercury to alcohol. The free-flowing fluid inside the pipe in the ceramic mass is also free to vibrate and absorb shocks and vibrations in order to improve the balance of the rotor.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A mechanical energy accumulator system comprising:
   a housing;
   a first pair of flywheels rotatable about a first axis within said housing;
   a second pair of flywheels rotatable about a second axis within said housing;
   a third pair of flywheels rotatable about a third axis within said housing, the flywheels of said first pair of flywheels being rotatable in opposite directions, the flywheels of said second pair of flywheels being rotatable in opposite directions, the flywheels of said third pair of flywheels being rotatable in opposite directions, the first axis and the second axis and the third axis being perpendicular to each other, said housing having openings thereon corresponding to locations of each of said first pair of flywheels and said second pair of flywheels and said third pair of flywheels, each flywheel of said first pair of flywheels and said second pair of flywheels and said third pair of flywheels being formed of a ceramic material, each of the flywheels of said first pair of flywheels and said second pair of flywheels and said third pair of flywheels having an interior area;

a stator positioned in the interior area of each of the flywheels;

a pipe shaft positioned interior of said stator, said pipe shaft having a plurality of magnets therein; and a pair of magnetic bearings positioned respectively at opposite end of said pipe shaft.

2. The mechanical energy accumulator system of claim 1, further comprising:

a pin-and-jewel bearing supporting said pipe shaft.

3. The mechanical energy accumulator system of claim 1, each of said pair of magnetic bearings being a doughnut magnet.

4. The mechanical energy accumulator system of claim 1, said housing having a vacuum in an interior thereof.

5. The mechanical energy accumulator system of claim 1, further comprising:

a pipe formed in each of said first a pair of flywheels and said second pair of flywheels and said third pair of flywheels, said pipe having a fluid therein.

6. The mechanical energy accumulator system of claim 5, the fluid filling approximately one half of a volume of the pipe.

7. The mechanical energy accumulator system of claim 5, wherein said pipe extends in a circular configuration concentric with an outer diameter of the flywheel.

8. The mechanical energy accumulator system of claim 1, each flywheel of said first pair of flywheels and said second pair of flywheels and said third pair of flywheels having a generally conical or double conical configuration.

9. A mechanical energy accumulator system comprising:

a housing;

a first pair of flywheels rotatable about a first axis within said housing;

a second pair of flywheels rotatable about a second axis within said housing;

a third pair of flywheels rotatable about a third axis within said housing, the flywheels of said first pair of flywheels being rotatable in opposite directions, the flywheels of said second pair of flywheels being rotatable in opposite directions, the flywheels of said third pair of flywheels being rotatable in opposite directions, the first axis and the second axis and the third axis being perpendicular to each other, said housing having openings thereon corresponding to locations of each of said first pair of flywheels and said second pair of flywheels and said third pair of flywheels, each flywheel of said first pair of flywheels and said second pair of flywheels and said third pair of flywheels being formed of a ceramic material, each of the flywheels of said first pair of flywheels and said second pair of flywheels and said third pair of flywheels having an interior area;

a stator positioned in the interior area of each of the flywheels;

a pipe shaft positioned interior of said stator, said pipe shaft having a plurality of magnets therein, the pair of magnets of said pipe shaft comprising four magnets arranged with a pair of N magnets at diametrically opposite locations in said pipe shaft and a pair of S magnets at diametrically opposite locations in said pipe shaft, the four magnets being generally spaced approximately 90° from each other around the circumference of said pipe shaft.

10. The mechanical energy accumulator system of claim 9, each of the four magnets having a magnetic face adjacent an outer diameter of said pipe shaft.

11. The mechanical energy accumulator system of claim 10, said pipe shaft and having a plurality of slots formed in a wall thereof, the plurality of slots opening to an interior diameter of said pipe shaft, the plurality of slots respectively receiving the plurality of magnets therein.

12. A mechanical energy accumulator system comprising:

a housing;

a first pair of flywheels rotatable about a first axis within said housing;

a second pair of flywheels rotatable about a second axis within said housing;

a third pair of flywheels rotatable about a third axis within said housing, the flywheels of said first pair of flywheels being rotatable in opposite directions, the flywheels of said second pair of flywheels being rotatable in opposite directions, the flywheels of said third pair of flywheels being rotatable in opposite directions, the first axis and the second axis and the third axis being perpendicular to each other, said housing having openings thereon corresponding to locations of each of said first pair of flywheels and said second pair of flywheels and said third pair of flywheels, each flywheel of said first pair of flywheels and said second pair of flywheels and said third pair of flywheels being formed of a ceramic material, each of the flywheels of said first pair of flywheels and said second pair of flywheels and said third pair of flywheels having an interior area;

a stator positioned in the interior area of each of the flywheels;

a pipe shaft positioned interior of said stator, said pipe shaft having a plurality of magnets therein;

a pipe positioned in the circular channel so as to extend in concentric with relationship to an outer diameter of the flywheel, said pipe having a fluid received in an interior thereof.

13. The mechanical energy accumulator system of claim 12, the fluid filling approximately one-half of a volume of said pipe.

14. The mechanical energy accumulator system of claim 12, said pipe positioned approximately midway between the outer diameter and an inner diameter of the flywheel.

* * * * *